United States Patent
Sapienza et al.

(10) Patent No.: US 7,138,071 B2
(45) Date of Patent: *Nov. 21, 2006

(54) ENVIRONMENTALLY BENIGN ANTI-ICING OR DEICING FLUIDS

(76) Inventors: Richard Sapienza, 1 Miller Ave., Shoreham, NY (US) 11786; Axel Johnson, 567 Benjamin Rd., North Babylon, NY (US) 11703; William Ricks, 1167 Scarlet Ct., Westerville, OH (US) 43081

( * ) Notice: Subject to any disclaimer, the term of this patent is extended or adjusted under 35 U.S.C. 154(b) by 0 days.

This patent is subject to a terminal disclaimer.

(21) Appl. No.: 11/103,753

(22) Filed: Apr. 12, 2005

(65) Prior Publication Data

US 2005/0179000 A1     Aug. 18, 2005

Related U.S. Application Data

(63) Continuation of application No. 10/341,540, filed on Jan. 13, 2003, now abandoned, which is a continuation-in-part of application No. 09/675,495, filed on Sep. 29, 2000, now Pat. No. 6,506,318, which is a continuation-in-part of application No. 09/436,811, filed on Nov. 9, 1999, now Pat. No. 6,129,857, which is a continuation of application No. 09/161,865, filed on Sep. 28, 1998, now Pat. No. 5,980,774, which is a continuation-in-part of application No. 08/940,936, filed on Sep. 30, 1997, now Pat. No. 5,876,621.

(51) Int. Cl.
*C09K 3/18* (2006.01)
(52) U.S. Cl. .......................... 252/70; 106/13
(58) Field of Classification Search ................. 252/70; 106/13
See application file for complete search history.

(56) References Cited

U.S. PATENT DOCUMENTS

| | | | |
|---|---|---|---|
| 1,776,181 A | 9/1930 | Collins | |
| 3,711,409 A | 1/1973 | Ayres | |
| 3,928,221 A * | 12/1975 | Slater et al. | .......... 252/70 |
| 4,108,790 A | 8/1978 | Foroulis | |
| 4,223,129 A | 9/1980 | Roth et al. | |
| 4,279,768 A | 7/1981 | Busch | |
| 4,329,449 A | 5/1982 | Roth et al. | |
| 4,426,409 A | 1/1984 | Roe | |
| 4,448,702 A | 5/1984 | Kaes | |
| 4,501,775 A | 2/1985 | Parks et al. | |
| 4,539,122 A | 9/1985 | Son et al. | |
| 4,647,392 A | 3/1987 | Darden | |
| 4,664,832 A | 5/1987 | Sandvig et al. | |
| 4,676,918 A | 6/1987 | Toth et al. | |
| 4,746,449 A | 5/1988 | Peel | |
| 4,759,864 A | 7/1988 | Van Neste et al. | |
| 4,869,841 A | 9/1989 | Matteodo et al. | |
| 4,954,279 A | 9/1990 | Ma et al. | |
| 4,960,531 A | 10/1990 | Connor et al. | |
| 5,071,582 A | 12/1991 | Conville et al. | |
| 5,135,674 A | 8/1992 | Kuhajek et al. | |
| 5,238,592 A | 8/1993 | Stankowiak et al. | |
| 5,244,600 A | 9/1993 | Cuisia et al. | |
| 5,268,116 A | 12/1993 | Fusiak et al. | |
| 5,324,442 A | 6/1994 | Mathews | |
| 5,330,683 A | 7/1994 | Sufrin | |
| 5,350,533 A | 9/1994 | Hubred et al. | |
| 5,376,293 A | 12/1994 | Johnston | |
| 5,387,358 A | 2/1995 | Himmrich et al. | |
| 5,387,359 A | 2/1995 | Himmrich et al. | |
| 5,395,658 A | 3/1995 | Jaklin | |
| 5,435,930 A | 7/1995 | Chan et al. | |
| 5,484,547 A | 1/1996 | Mendoza | |
| 5,531,931 A | 7/1996 | Koefod | |
| 5,635,101 A | 6/1997 | Janke et al. | |
| 5,639,319 A | 6/1997 | Daly | |
| 5,708,068 A | 1/1998 | Carder et al. | |
| 5,709,812 A | 1/1998 | Janke et al. | |
| 5,709,813 A | 1/1998 | Janke et al. | |
| 5,718,834 A | 2/1998 | Pollmann et al. | |
| 5,741,436 A | 4/1998 | Gershun et al. | |
| 5,772,912 A | 6/1998 | Lockyer et al. | |
| 5,819,776 A | 10/1998 | Kephart | |
| 5,849,356 A | 12/1998 | Gambino et al. | |
| 5,853,610 A | 12/1998 | Kaes | |
| 5,876,621 A | 3/1999 | Sapienza | |
| 5,891,225 A | 4/1999 | Mishra et al. | |
| 5,904,321 A | 5/1999 | Cox et al. | |
| 5,922,240 A | 7/1999 | Johnson et al. | |
| 5,928,477 A | 7/1999 | Gammon et al. | |
| 5,942,481 A | 8/1999 | Talley | |
| 5,965,058 A | 10/1999 | Janke et al. | |
| 5,980,774 A | 11/1999 | Sapienza | |
| 5,993,684 A | 11/1999 | Back et al. | |
| 6,060,122 A | 5/2000 | Rossmaier | |
| 6,080,330 A | 6/2000 | Bloomer | |
| 6,120,651 A | 9/2000 | Gammon et al. | |

(Continued)

FOREIGN PATENT DOCUMENTS

GB     796633     6/1958

(Continued)

OTHER PUBLICATIONS

Sieghart et al., "Potassium Carbonate as an Alternative Deicer: Impact on Soil Properties and Vegetation.", no date.

(Continued)

*Primary Examiner*—Anthony J. Green
(74) *Attorney, Agent, or Firm*—Hedman & Costigan, P.C.

(57) ABSTRACT

Deicing compositions comprised of hydroxyl-containing organic compounds and/or organic acid salts are disclosed.

10 Claims, No Drawings

U.S. PATENT DOCUMENTS

| | | |
|---|---|---|
| 6,129,857 A | 10/2000 | Sapienza |
| 6,149,834 A | 11/2000 | Gall et al. |
| 6,156,226 A | 12/2000 | Klyosov et al. |
| 6,156,227 A | 12/2000 | Koefod |
| 6,287,480 B1 | 9/2001 | Berglund et al. |
| 6,299,793 B1 | 10/2001 | Hartley et al. |
| 6,315,919 B1 * | 11/2001 | Sapienza ............... 252/70 |
| 6,398,979 B1 | 6/2002 | Koefod et al. |
| 6,436,310 B1 | 8/2002 | Hartley et al. |
| 6,440,325 B1 | 8/2002 | Hartley et al. |
| 6,478,971 B1 | 11/2002 | Koefod et al. |
| 6,506,318 B1 * | 1/2003 | Sapienza et al. ........... 252/70 |
| 6,540,934 B1 | 4/2003 | Sapienza et al. |
| 6,544,434 B1 | 4/2003 | Sapienza et al. |
| 6,890,451 B1 * | 5/2005 | Sapienza et al. ........... 252/70 |

FOREIGN PATENT DOCUMENTS

| | | |
|---|---|---|
| GB | 2001095 A | 1/1979 |
| GB | 2050398 A | 1/1981 |
| JP | 62-201566 | 9/1987 |
| JP | 02-202574 | 8/1990 |
| WO | WO 01/07532 | 2/2001 |
| WO | WO 01/51584 | 7/2001 |
| WO | WO 01/64811 | 9/2001 |

OTHER PUBLICATIONS

Institute of Forest Ecology University of Agricultural Sciences, Peter Jordanstrasse 82, A-1190 Wien, Austria, no date.

* cited by examiner

ENVIRONMENTALLY BENIGN ANTI-ICING OR DEICING FLUIDS

CROSS REFERENCES TO RELATED APPLICATIONS

This application is a continuation of application Ser. No. 10/341,540, filed Jan. 13, 2003, now abandoned which in turn is a continuation-in-part of application Ser. No. 09/675,495, filed Sep. 29, 2000, now U.S. Pat. No. 6,506,318, issued Jan. 14, 2003, which in turn is a continuation-in-part of application Ser. No. 09/436,811, filed Nov. 9, 1999, now U.S. Pat. No. 6,129,857, which in turn is a continuation of application Ser. No. 09/161,865, filed Sep. 28, 1998, now U.S. Pat. No. 5,980,774, issued Nov. 9, 1999, which in turn is a continuation-in-part of application Ser. No. 08/940,936, filed Sep. 30, 1997, now U.S. Pat. No. 5,876,621, issued Mar. 2, 1999.

FIELD OF THE INVENTION

The present invention relates to deicing fluid compositions and methods for deicing surfaces. More particularly the present invention relates to deicing fluid compositions comprising hydroxyl-containing organic compounds and/or certain organic acid salts that are relatively environmentally benign.

BACKGROUND OF THE INVENTION

Freezing point lowering compositions are in widespread use for a variety of purposes, especially to reduce the freezing point of an aqueous system so that ice cannot be formed or to melt formed ice. Generally, freezing point lowering compositions depend for their effectiveness upon the molar freezing point lowering effect, the number of ionic species that are made available and the degree to which the compositions can be dispersed in the liquid phase in which the formation of ice is to be precluded and/or ice is to be melted.

The most pervasive of the commonly used products for deicing are common salt, calcium chloride and urea, with common salt (sodium chloride) being the least expensive and most commonly used. Common salt is widely used to melt ice on road surfaces and the like. In this manner the salt forms a solution with the available liquid in contact with the ice and thereby forms a solution with a lower freezing point than the ice itself so that the ice is melted. Chloride salts however suffer from relatively severe drawbacks, such as the harmful effects on surrounding vegetation by preventing water absorption in the root systems, the corrosive effects on animal skin such as the feet of animals, clothing, roadways and motor vehicles, and the deleterious effects on surface and ground water. Thus, any new method of deicing or new deicing composition that can reduce the amount of chloride salts would solve a long felt need in the art.

For example, in roadway deicing applications, liquid calcium chloride (32%) is typically the preferred material when temperatures are too low for rock salt to be effective. However, the use of chloride salts often is not permitted or needs to be reduced in certain areas because of its highly corrosive nature, which causes destruction of surrounding vegetation, damage to roadways and vehicles, and contamination of water supplies.

Another drawback of certain prior art deicing fluids is the high chemical and biological oxygen demand that make them environmentally unfavorable. The glycols are exemplary of deicing fluids that particularly suffer from this type of environmental drawback. Thus, any new method of deicing or new deicing composition that can reduce the amount of glycols would solve a long felt need in the art.

Due to the problems associated with deicing agents as described above, there have been attempts to prepare even more deicing agents. For, example, Kaes, U.S. Pat. No. 4,448,702, discloses the use of a freezing-point lowering composition and method that calls for the addition of a water-soluble salt of at least one dicarboxylic acid having at least three carbon atoms, such as a sodium, potassium, ammonium or organoamine salt of adipic, glutaric, succinic or malonic acid.

Peel, U.S. Pat. No. 4,746,449, teaches the preparation of a deicing agent comprising 12–75% acetate salts, trace-36% carbonate salts, 1–24% formate salts and 1–32% pseudolactate salts that is prepared from a pulp mill black liquor by fractionating the black liquor into a low molecular weight fraction and concentrating the collected low molecular weight fraction to produce the deicing agent.

U.S. Pat. No. 4,960,531 teaches that small amounts of methyl glucosides, i.e., less than 10%, in combination with a low amount, i.e., about 2.5%, of potassium carbonate can be employed as a trigger to conventional salt deicers. The '531 patent is an improvement patent on U.S. Reissue Pat. No. RE 32,477 that teaches the use of a salt mixture of sodium and potassium chloride and an amide. Other inorganic salts are also known to be useful as freezing point lowering agents such as magnesium chloride, potassium phosphates, sodium phosphates, ammonium phosphates, ammonium nitrates, alkaline earth nitrates, magnesium nitrate, ammonium sulfate, and alkali sulfates.

Special mention is also made of Sapienza, U.S. Pat. No. 5,876,621 and Sapienza, U.S. Pat. No. 5,980,774 that disclose especially useful deicing and anti-icing compositions.

Solutions of low freezing point deicing and anti-icing agents typically include brines, ethylene glycol and propylene glycol solutions. The use of brines in anti-icing compounds can reduce, although not eliminate, the impacts of chlorides. Brines are used to transfer heat at temperatures below the normal freezing point of water. Ethylene glycol solutions are well known for use as coolants for automobiles and the like in regions in which the temperature may fall below the normal freezing point of water. Ethylene and propylene glycols are used in relatively large quantities at major airports in northern climates in order to keep air traffic flowing during inclement weather. The fluids generally are applied to the wings, fuselage and tail of aircraft as well as the runways to remove ice. However, these glycol compounds likewise have environmental drawbacks and can be detrimental to sewage treatment processes.

Other prior art deicing fluids, such as alcohols, have toxic effects and high volatility particularly in the low molecular weight range and may be the cause of offensive smell and fire danger. Furthermore, mono- and polyhydric alcohols oxidize in the presence of atmospheric oxygen to form acids, which can increase corrosion of materials.

Yet another reason why new deicing fluids are needed emerges from the recent changes to the freezing point requirements of the SAE AMS 1435A specification for airport runway deicing fluids. Newer AMS 1435A specifications require deicing fluids to have a freezing point of less than −14.5° C. for a 1:1 weight dilution. These specifications are such that many technologies, including existing glycol-based fluids currently used commercially, no longer meet the new requirements, including ASTM D 1177.

As such there exists in the art a need for new and improved deicing and/or anti-icing agents. Preferably these are free or substantially free of inorganic salts, are environmentally benign and are prepared from relatively inexpensive raw materials while still possessing desirable freezing point depression properties. Likewise, there also exists a need in the art for new deicing and/or anti-icing agents that can be used in combination with prior art deicing agents, such as inorganic salts or glycols, to substantially reduce the amount of inorganic salts or glycols, and thereby concomitantly reduce the environmental affects of the salts and/or glycols. Surprisingly, it has been found that compositions disclosed herein meet these needs.

The total active composition of the new deicing and/or anti-icing agents can vary from about 5 to about 100 weight percent. Improved solid deicers can be prepared that can be applied in the same manner as solid chloride salts with the environmental advantages described earlier.

SUMMARY OF THE INVENTION

Accordingly, in one preferred embodiment the present invention provides a deicing and/or anti-icing composition comprising (a) glycerols and (b) water.

In another preferred embodiment the present invention also provides a method for deicing or anti-icing a surface comprising applying to the surface an effective amount of a de-icing agent and/or anti-icing agent comprising glycerols and water.

In a further preferred embodiment of the present invention there is provided a deicing and/or anti-icing composition comprising (a) glycerol, (b) an organic acid salt selected from the group consisting of a carboxylic acid salt, a hydroxycarboxylic acid salt, a dicarboxylic acid salt and mixtures of any of the foregoing and (c) water.

In still a further preferred embodiment of the present invention there is provided a method for de-icing or anti-icing a surface comprising applying to the surface an effective amount of a de-icing agent and/or anti-icing agent comprising (a) glycerols, (b) an organic acid salt selected from the group consisting of a carboxylic acid salt, a hydroxycarboxylic acid salt, a dicarboxylic acid salt and mixtures of any of the foregoing and (c) water.

In another further preferred embodiment of the present invention there is provided a deicing and/or anti-icing composition comprising (a) a hydroxyl-containing organic compound selected from the group consisting of hydrocarbyl aldosides including di- and polysaccharides such as sucrose, sorbitol and other hydrogenation products of sugars, monosaccharides, maltodextrins and sucrose, maltitol, glycols, monosaccharides, glycerol and mixtures of any of the foregoing, (b) a carbonate salt and (c) water.

In still another further preferred embodiment of the present invention there is provided a method for de-icing and/or anti-icing a surface comprising applying to the surface an effective amount of a de-icing agent and/or anti-icing agent comprising (a) a hydroxyl-containing organic compound selected from the group consisting of hydrocarbyl aldosides including di- and polysaccharides such as sucrose, sorbitol and other hydrogenation products of sugars, monosaccharides, maltodextrins and sucrose, maltitol, glycols, monosaccharides, glycerol and mixtures of any of the foregoing, (b) a carbonate salt and (c) water.

It is still further contemplated that useful deicing and/or anti-icing agents can be prepared from combinations of sorbitol and glycerol with water and with other materials such as carbonates and acetates, etc. These are especially useful for aircraft and airport runway deicing and/or anti-icing applications.

The present inventors have still further found that excellent deicing compositions can be obtained by upgrading recovered airport and/or aircraft runoffs or other sources of recycled or recovered glycols (i.e., radiator fluids and gas dehydration glycol fluid). For example, the recovered runoffs, which typically contain at least about 5%, preferably at least about 10% by weight of glycol, or more, can be upgraded by adding effective amounts of (a) a hydroxyl-containing organic compound selected from the group consisting of hydrocarbyl aldosides, sorbitol and other hydrogenation products of sugars, monosaccharides, maltodextrins and sucrose, maltitol, glycols, monosaccharides, glycerols and mixtures thereof and/or (b) an organic acid salt selected from the group consisting of a carbonic acid salt, a carboxylic acid salt, a hydroxycarboxylic acid salt, a dicarboxylic acid salt and mixtures thereof. These upgraded runoffs can then be used directly as de-icing and/or anti-icing agents for surfaces such as bridges, runways and highways. Additionally, these can be used for the deicing or anti-icing of almost any surface, including, but not limited to particulate surfaces, such as salt, mineral ores and/or coal piles.

Another benefit of the present invention is seen in that when carbohydrates are added to salts, such as potassium acetate, the viscosity and wetting abilities of the deicing and/or anti-icing compound are increased. This has a dual effect of providing a compound that will not readily run off the surface, and of also providing a more persistent film that does not leave a dry powder after the surface later dries.

Further, in embodiments where some inorganic salt can be tolerated, such as on certain highway applications, the present invention further provides for upgrading recovered airport runoffs by addition of effective amounts of inorganic salts, such as sodium chloride, magnesium and/or calcium chloride and the like. Such compositions have improved environmental effects by reducing the amount of inorganic salts employed to obtain the same or better deicing and/or anti-icing properties.

The present invention still further provides a method for reducing the amount of inorganic salt necessary to achieve effective deicing and/or anti-icing, comprising adding to the inorganic salt, an effective amount of a deicing agent selected from the group consisting of glucosides, furanosides, maltosides, maltotriosides, glucopyranosides, sorbitols and other hydrogenation products of sugars, monosaccharides, maltodextrins and sucrose, glycerols and mixtures of any of the foregoing.

The compositions and methods of the present invention can be applied to a wide variety of surfaces, including both metallic and non-metallic surfaces of aircraft, which prevents icing, removes frozen water from the surface and prevents its reformation. The invention provides for a deicing composition that can be used on airplanes, runways, bridges, streets and the like. Further, the compositions can be used in heat transfer applications and other applications in which it is preferable to maintain a liquid in the unfrozen state, e.g., as in a fire extinguisher, car radiators, heat transfer systems, gas dehydration systems, lavatory fluids, protection of plumbing lines, drilling fluids, etc. In these applications, the compositions of the present invention can be use to replace completely or partially, or in addition to any of the glycols normally employed, including, triethylene glycol. Additionally, the present invention provides for an anti-icing composition that can be applied to a surface, such as bridges, prior to the onset of icing conditions in order to prevent icing from occurring. Still further, the compositions of the present invention can be used as a deicer and/or anti-icer for pre-harvest fruits, vegetable crops and other vegetation, such as golf course greens.

In still further embodiments, the compositions of the present invention are useful to prevent freezing or de-freezing in a wide variety of other applications. An example is that the compositions of the present invention can be used in drilling fluids used to break-up (melt) frozen gas hydrates.

In another embodiment of the present invention, there is provided a method of producing deicing and/or anti-icing formulations using recovered airport storm water as a medium for producing organic salts such as potassium acetate and potassium lactate in order to provide a glycol/organic acid salt deicing formulation.

DETAILED DESCRIPTION OF THE PRESENT INVENTION

The present invention provides novel compositions useful as deicing agents and/or anti-icing agents. The deicing agents of the present invention comprise certain hydroxyl-containing organic compounds, certain organic acid salts, alone or in admixture with each other.

It is also envisioned that the compositions of the present invention can be used in either a liquid or a solid format. For instance, the compound can be prepared as a liquid and sprayed on or spread on surfaces. Alternatively, it can be prepared in a solid form and employed as a powder. Optionally, the solid may be further processed using methods well known in the art, such as, for example, pelletizing, prilling, flaking, or macerating to provide the formulation in a final useable powdered or granular form. Any of the binders known to those skilled in the art optionally may be present and may either be inert or may be comprised of components that actively help lower the freezing point. For example, cinders, sawdust, sand, gravel, sugars, maltodextrins and mixtures thereof and the like can be used.

The amount of deicing or anti-icing agent of the present invention that is present in the total composition of the present invention can vary from about 5 to about 100 weight percent. Preferably, the de-icing agent and/or anti-icing agent is present in an amount ranging from about 5 or 10 to about 90 weight percent, more preferably is present in an amount ranging from about 15 to about 80 weight percent, and most preferably is present in an amount ranging from about 30 to about 70 weight percent. In many preferred embodiments, the deicing agents and/or anti-icing agents are used in about the same proportion as water, i.e., in a weight ratio of about 1:1 agent:water. In solid formulations, the deicing and/or anti-icing agents may comprise 100% of the final formulation.

The hydroxyl-containing organic compounds useful in certain embodiments of the present invention are generally selected from the group of hydrocarbyl aldosides, sorbitol and other hydrogenation products of sugars, monosaccharides, maltodextrins and sucrose, maltitol, glycols, monosaccharides, glycerols and mixtures thereof.

The hydrocarbyl aldosides useful in the practice of the present invention are known to those of ordinary skill in the art, such as the di- and polysaccharides. An example of a hydrocarbyl aldoside is the glucopyranoside sucrose (table sugar). Preferably, the hydrocarbyl aldosides comprise alkyl aldosides. Alkyl aldosides can be prepared, for example, as described in U.S. Pat. Nos. 4,223,129 and 4,329,449 that are incorporated herein by reference.

Typical of the alkyl aldosides useful in the practice of the present invention are alkyl furanosides, alkyl maltosides, alkyl maltotriosides, alkylglucopyranosides mixtures thereof and the like.

Other hydroxyl-containing organic compounds useful in the practice of the present invention are sorbitol and other hydrogenation products of sugars, monosaccharides, maltodextrins and sucrose, such as maltitol, xylitol and mannitol, glycols such as ethylene glycol and propylene glycol, glycerols and monosaccharides and mixtures of any of the foregoing. These materials are available commercially and are well known to those of ordinary skill in the art.

The organic salt components useful in the practice of the present invention include the carboxylic acid salts, the hydroxycarboxylic acid salts, dicarboxylic acid salts and mixtures thereof.

The carboxylic acid salts that are useful in the practice of the present invention are likewise available commercially and are known to those skilled in the art. Carboxylic acid salts preferred for use in the practice of the present invention comprise the sodium or potassium salts of formates, acetates, propionates, butyrates and mixtures thereof. Also preferred are potassium acetate and/or potassium formate.

The hydroxycarboxylic acid salts that are useful in accordance with the present invention are available commercially and are known to those skilled in the art. Preferred hydroxycarboxylic acid salts comprise the salts of lactic acid, such as sodium lactate and potassium lactate. However, any of the cesium, sodium, potassium, calcium and/or magnesium salts of hydroxycarboxylic acids may be employed such as sodium gluconate.

The dicarboxylic acid salts that are useful in accordance with the present invention are available commercially and are known to those skilled in the art. Preferred dicarboxylic acid salts comprise sodium and potassium salts of oxalates, malonates, succinates, glutarates, adipates, maleates, fumarates and mixtures of any of the foregoing.

Also useful as a deicing component in certain of the compositions of the present invention are the high solubility carbonic acid salts. Preferred carbonate salts for use in the practice of the present invention are potassium carbonate, potassium bicarbonate, sodium carbonate and cesium carbonate. Potassium carbonate is especially preferred. In many applications, the addition of carbonic acid salts, such as potassium carbonate, has been found to provide synergistically unexpected reductions in freezing points. For example, a 50/50 mixture of potassium acetate and water has a freezing point of −60° C., as seen in Table 1, Example 9. When this solution is mixed with the 50/50 sorbitol water mixture from Table 1, Example 1 (freezing point −11° C.) the resulting soludion as reported in Example 23 has a freezing point of −32° C., which is only 6° C. below the arithmetic average of the two base stocks. However, it was discovered that when combining potassium carbonate solution from Example 7 (47% potassium carbonate in water, freezing point −20° C.) on a 1:1 basis with the 50/50 sorbitol/water mixture from Example 1 (freezing point −11° C.), the resulting compound as reported in Example 11 had the surprisingly low freezing point of −27° C., which is 15.5° C. lower than the arithmetic average.

In certain instances, where the pH of the carbonic acid or its salt is too high to meet regulatory or industry specifications, it is contemplated herein to use a buffering agent to lower the pH to acceptable levels. Suitable buffering agents may be selected from any of the known buffering agents. Especially preferred is boric acid. For example, in highway applications, compositions including potassium carbonate and/or potassium bicarbonate in combination with a hydroxyl-containing component of the present invention or industrial process stream containing same, the pH in some formulation may be above 12, and most state highway departments prefer deicers having a pH below 12. An effective amount of boric acid or other buffering agent may be added to reduce the pH of the deicing compounds to less than 12, i.e., from about 11.5 to about 11.8 or lower, to meet the specifications. Alternatively, during the preparation of the carbonate, the pH can be adjusted by continued reaction to bicarbonate or separate addition of same.

Thus, the instant invention provides equally effective, but considerably less expensive product than the prior art, as potassium carbonate of the present invention costs generally about 30% less than the commonly used potassium acetate of the prior art. Carbonic acid salts are available commercially and can be prepared by methods known to those of ordinary skill in the art.

Generally the organic freezing point lowering agents useful in the practice of the present invention may be used in solid form or mixed with water as pure components. However, it is contemplated that the present invention may employ a number of industrial or agricultural process streams that comprise a water soluble solution of carboxylic acid salts, hydroxycarboxylic acid salts and/or dicarboxylic acid salts. Although the purification of these materials is difficult due to their similarity in solubility characteristics to water, the dilute industrial or agricultural streams may be used directly in the practice of the present invention. The present invention contemplates, for non-limiting examples, the use of industrial or agricultural process streams selected from the group consisting of a grain stillage (grain steepwaters), a wood stillage, agricultural or milk fermentation processes, sugar extraction processes such a desugared sugar beet molasses and/or desugared sugar cane molasses, hydrogenation products of sugars, monosaccharides, maltodextrins and sucrose and mixtures of any of the foregoing. Generally, the components of the present invention are present in or may be readily derived by alcoholysis of the industrial process streams.

Certain of these industrial process streams may include components such as low molecular weight sugars, such as, for example, sorbitols, sucroses, maltoses and glucoses. Where desired, by subjecting these waste streams to alcoholysis (with an alkyl alcohol) under conditions such as reacting with an alkyl alcohol in the presence of a cation exchange material or other acid, or the addition of an alkyl alcohol to a heated fermentation liquor at least some of the sugars will be converted to glucosides. For instance, ethanol treatment of a typical agricultural fermentation process stream comprising glucose would be at least partially converted to ethyl glucoside.

In addition to (a) the certain hydroxyl-containing organic compounds and (b) the certain organic acid salts, it is contemplated by the present invention that other organic components may be included in the deicing and/or anti-icing compositions of the present invention. Exemplary of such materials are citrate salts such as sodium citrate; amino acids and their salts such as lysine glutamate, sodium pyrrolidone carboxylate and sodium glucoheptonate; lignin components such as lignin sulfonate; boric acid and its salts; sodium gluconate and other gluconic acid salts; and mixtures of any of the foregoing.

In the methods of the present invention, the deicing and/or anti-icing compositions of the present invention are applied, such as by spraying or injecting for liquid forms, or spreading for solid forms onto the surface desired to be treated. In the case of deicing, the surface already has ice formed thereon or liquid is already in ice form, and the deicing compositions of the present invention melt the ice already formed and are further effective in preventing additional ice formation. In the case of anti-icing, upon learning of a weather forecast that predicts possible dangerous icing conditions, the roads, bridges, airplanes, runways, growing produce or other surfaces or liquids can be pretreated with the anti-icing compositions of the present invention in similar manner in order to prevent ice formation on the treated surfaces or in the treated liquids.

In specific applications, certain embodiments of the present invention are especially preferred due to certain regulatory or industry guidelines. For example, in the deicing and/or anti-icing of aircraft, it is preferred to use deicing and/or anti-icing agents of methyl glucoside; a mixture of sorbitol and glycerol; or a mixture of methyl glucoside, sorbitol and/or glycerol with sodium lactate and/or potassium lactate.

For the deicing and/or anti-icing of runways, it is preferred to use deicing and/or anti-icing agents of sodium lactate; potassium lactate; a mixture of sodium lactate and potassium lactate; a hydroxyl-containing organic compound in combination with sodium lactate, potassium lactate and/or potassium acetate; a mixture of sodium lactate and/or potassium lactate with potassium acetate; or potassium carbonate.

For de-icing and/or anti-icing of pre-harvest fruits and vegetables, such as fruit trees or grape vines, it is preferred to use de-icing and/or anti-icing agents of a hydroxyl-containing organic compound in combination with an organic acid salt, particularly a lactate salt.

The present invention also provides for the re-use of glycols recovered from airport collection systems for the de-icing and/or anti-icing of bridges, runways and highways. Of course, glycols can be recovered or recycled from other sources, such as, but not limited to, radiator fluids and/or gas dehydration glycol fluids. Currently, pure glycols are used to de-ice and/or anti-ice aircraft. The practice of collecting the glycol solutions that run off aircraft, either by using dedicated drainage systems or vacuum collection trucks, is increasing. However, the runway material cannot be collected efficiently and the salvaged material is very dilute. The present inventors have found that the used glycols can be recovered and reused as de-icing agents and/or anti-icing agents by upgrading these glycols and then re-applying the upgraded glycols. The upgrading of these glycols comprises the addition of a polyhydroxyl and/or organic acid salt to the recovered glycol. Also, where tolerable, the recovered glycols can be upgraded by the addition of inorganic salts, such as sodium chloride. The formulations of the present invention, such as sorbitol/glycerol or methyl glucoside can be recovered in the same way.

Generally, after application on the runway, the glycols are recovered in concentrations of about 10–20 weight percent. In accordance with the present invention, the addition of from about 5 to about 50 weight percent, preferably from about 30 to about 40 weight percent, based on the total weight of the composition, of the hydroxyl-containing organic compounds of the present invention, the organic acid salts of the present invention or combinations thereof provides for an effective upgraded glycol-recovered runoff, which can be reused for de-icing and/or anti-icing on bridges, for airport or aircraft deicing and highways. Where inorganic salts can be tolerated, similar amounts of inorganic salts alone, or in combination with the hydroxyl-containing organic compounds and/or organic acid salts, may also be added.

In other situations where some inorganic salts can be tolerated, the present invention provides an improved method for reducing the amount of salt to be added to achieve an equivalent or better deicing and/or anti-icing effect, and thereby reduce the detriment to the environment. In these embodiments, the present invention provides for replacing a portion of the inorganic salt with the hydroxyl-containing organic compounds of the present invention, the organic acid salts of the present invention, or a combination thereof.

The present invention also provides an advantageous method for producing deicing and/or anti-icing formulations using recovered airport storm water as a medium for production of organic salts, such as potassium acetate and potassium lactate, in order to accomplish a glycol/organic acid salt deicing formulation. This advantageous method addresses two issues: (1) the fact that the concentration of glycol or other deicing component recovered in storm water is usually quite low—about 10% or less; and (2) transportation of contained water as a major cost item in liquid deicing formulations. Technologies to concentrate the storm water are available, but the cost increases substantially as a function of the level of glycol concentration required.

Typically organic salts, such as potassium acetate, are produced by adding glacial acetic acid to a solution of potassium hydroxide. In the method of the present invention, the KOH solution would be prepared at or near the airport by adding solid KOH to recovered storm water containing glycol instead of water. Glacial acetic acid would then be added to produce the organic salt.

Since the airports are generally located at or near metropolitan centers, this method would produce the product near its point of consumption, reducing the cost of transportation. Further, by using storm water instead of water to produce the final formulation, a lower concentration of glycol is needed to achieve the desired final concentration.

DESCRIPTION OF THE PREFERRED EMBODIMENTS

The testing results as reported in the examples below were obtained using the following procedures. Freezing points were determined by the ASTM D 1177 method. A fluid sample was placed in a cold bath and cooled at a steady rate while monitoring the temperature of the sample and plotting temperature as a function of time. When ice crystals begin to form in a sample, the temperature remains constant until the entire sample freezes, creating an inflection point on the cooling curve indicative of the fluid freezing point. This test is useful in determining the useable temperature range of a deicing fluid and provides an indication as to the ice melting capability and dilution capacity of the fluid.

The Kinematic Viscosity of the fluid was determined by the ASTM D445 method and is defined as a fluid's resistance to flow. Viscosity is an important property of any fluid, and in the case of deicing fluids, viscosity is important in aspects of fluid application and adherence. A fluid with a very high viscosity may be too thick to spray through application equipment, whereas a fluid with a very low viscosity may be too thin to adhere to the treated surface and run off. An optimum viscosity permits a fluid to be applied easily with conventional spray equipment and allows it to adhere to the surface for extended periods of time to prevent ice from forming on and bonding to the surface.

Conductivity is a measure of a fluid's ability or tendency to conduct an electric current. This property is an important factor in determining if a fluid is acceptable to be used near electrical wiring. Additionally, high conductivity can also lead to corrosion of metals, as corrosion is an electrochemical reaction.

The pH of a fluid may affect its compatibility with various materials of construction it may contact (metals in particular). In order to minimize metal corrosion, most deicing fluids are formulated to a pH that is neutral to slightly basic in order to keep the fluid within the passivation range of the metals commonly used in construction.

COD and BOD were measured by standard EPA methods. COD is defined as the amount of oxygen required to chemically oxidize an organic compound completely to carbon dioxide and water. It is expressed as grams $O_2$ per gram of compound. BOD is defined as the amount of oxygen consumed through the biodegradation of an organic compound by the action of microorganisms. The BOD/COD ratio often provides useful information as to the biodegradability and rate of biodegradation of an organic compound. Compounds that exhibit a high BOD or a high BOD/COD ratio, such as propylene glycol, can lead to rapid depletion of dissolved oxygen in water, which can lead to fish kills in natural waterways. This is a potential hazard for deicing fluid run off into storm sewers and streams. Ideally, a deicing fluid should biodegrade completely, but at a moderate rate that is less than that of propylene glycol.

The DOT corrosion test method used follows the NACE Standard TM-01-69 (1976 revision) as modified by Pacific Northwest Snowfighters consortium. This test is applicable to roadway deicing chemicals that are likely to contact carbon steel structural materials used in application equipment, automobiles, bridges, etc. It is intended to simulate accelerated conditions of repeated and prolonged exposures of steel substrates to dilute concentrations of deicing chemicals under cyclic wet-dry conditions. Deicing chemicals were evaluated for rate of corrosion of standard carbon steel substrate and compared with the rates obtained for distilled water and 3% sodium chloride solutions as controls.

The following examples are provided for illustrative purposes and are not to be construed to limit the scope of the claims in any manner whatsoever.

EXAMPLES 1–34

Deicing and/or anti-icing fluids were prepared from pure compounds in accordance with the present invention. They were then tested for freezing point, viscosity, conductivity, pH, COD, BOD and corrosion. MBS refers to desugared beet molasses from Michigan Beet Sugar. The results are reported below in Table 1.

|  | EXAMPLE | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Composition | | | | | | | | | | | | | |
| Sorbitol | 50 | 0 | 0 | 0 | 0 | 0 | 0 | 0 | 0 | 0 | 25 | 0 | 0 |
| MeG | 0 | 50 | 0 | 0 | 0 | 0 | 0 | 0 | 0 | 0 | 0 | 25 | 0 |
| Glycerol | 0 | 0 | 50 | 0 | 0 | 0 | 0 | 0 | 0 | 0 | 0 | 0 | 25 |
| Propylene Glycol | 0 | 0 | 0 | 50 | 0 | 0 | 0 | 0 | 0 | 0 | 0 | 0 | 0 |

-continued

| | | | | | | | | | | | | | |
|---|---|---|---|---|---|---|---|---|---|---|---|---|---|
| MBS | 0 | 0 | 0 | 0 | 50 | 0 | 0 | 0 | 0 | 0 | 0 | 0 | 0 |
| Sucrose | 0 | 0 | 0 | 0 | 0 | 50 | 0 | 0 | 0 | 0 | 0 | 0 | 0 |
| Potassium Carbonate | 0 | 0 | 0 | 0 | 0 | 0 | 47 | 0 | 0 | 0 | 25 | 25 | 25 |
| Sodium Formate | 0 | 0 | 0 | 0 | 0 | 0 | 0 | 25 | 0 | 0 | 0 | 0 | 0 |
| Potassium Acetate | 0 | 0 | 0 | 0 | 0 | 0 | 0 | 0 | 50 | 0 | 0 | 0 | 0 |
| Sodium Lactate | 0 | 0 | 0 | 0 | 0 | 0 | 0 | 0 | 0 | 50 | 0 | 0 | 0 |
| Water | 50 | 50 | 50 | 50 | 50 | 50 | 53 | 75 | 50 | 50 | 50 | 50 | 50 |
| Properties | | | | | | | | | | | | | |
| Freezing Point, °C. | −11 | −16 | −23 | −33 | −16 | −7.5 | −20 | −19.5 | −60 | −32 | −27 | −33 | −37 |
| Viscosity, cSt | | | | | | | | | | | | | |
| 22° C. | 7.6 | 8.4 | 4.5 | 6.0 | 4.9 | 10.4 | 4.3 | 1.9 | 3.8 | 16.9 | 8.4 | 9.5 | 7.2 |
| −7° C. | 39.4 | 40.4 | 15.8 | 26.3 | 15.0 | 44.7 | 11.5 | 4.5 | 10.2 | 110.3 | 27.5 | 32.4 | 19.8 |
| Conductivity, mS/cm | 0.003 | 0.668 | 0.003 | 0.002 | 294 | <.001 | 880 | 354 | 654 | 401 | 466 | 486 | 470 |
| pH | 5.48 | 4.53 | 5.04 | 5.81 | 8.66 | 5.88 | >13 | 7.91 | 9.87 | 7.19 | 12.63 | 12.73 | 12.72 |
| COD kg/kg | 0.60 | 0.63 | 0.68 | 0.82 | 0.32 | 0.53 | 0.04 | 0.04 | 0.34 | 0.47 | 0.21 | 0.26 | 0.26 |
| BOD kg/kg | 0.34 | 0.34 | 0.33 | 0.53 | 0.13 | 0.24 | <0.005 | 0.33 | 0.18 | 0.24 | 0.16 | 0.10 | 0.18 |
| PNSDOT Corrosion | −3.1 | −0.8 | −3.5 | −2.2 | 14.9 | −2.58 | 0.3 | 68.2 | −2.5 | −1.8 | −1.1 | −0.5 | |

| | EXAMPLE | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Composition | | | | | | | | | | | | | |
| Sorbitol | 0 | 0 | 0 | 25 | 0 | 0 | 0 | 0 | 0 | 25 | 0 | 0 | 0 |
| MeG | 0 | 0 | 0 | 0 | 25 | 0 | 0 | 0 | 0 | 0 | 25 | 0 | 0 |
| Glycerol | 0 | 0 | 0 | 0 | 0 | 25 | 0 | 0 | 0 | 0 | 0 | 25 | 0 |
| Propylene Glycol | 25 | 0 | 0 | 0 | 0 | 0 | 25 | 0 | 0 | 0 | 0 | 0 | 25 |
| MBS | 0 | 25 | 0 | 0 | 0 | 0 | 0 | 25 | 0 | 0 | 0 | 0 | 0 |
| Sucrose | 0 | 0 | 25 | 0 | 0 | 0 | 0 | 0 | 25 | 0 | 0 | 0 | 0 |
| Potassium Carbonate | 25 | 25 | 25 | 0 | 0 | 0 | 0 | 0 | 0 | 0 | 0 | 0 | 0 |
| Sodium Formate | 0 | 0 | 0 | 25 | 25 | 25 | 25 | 25 | 25 | 0 | 0 | 0 | 0 |
| Potassium Acetate | 0 | 0 | 0 | 0 | 0 | 50 | 0 | 0 | 0 | 25 | 25 | 25 | 25 |
| Sodium Lactate | 0 | 0 | 0 | 0 | 0 | 0 | 50 | 0 | 0 | 0 | 0 | 0 | 0 |
| Water | 50 | 50 | 50 | 53 | 75 | 50 | 50 | 50 | 50 | 50 | 50 | 50 | 50 |
| Properties | | | | | | | | | | | | | |
| Freezing Point, °C. | −52* | −36 | −26 | −22 | −23 | −34 | −15 | −21 | −24 | −32 | −34 | −41 | −51.3 |
| Viscosity, cSt | | | | | | | | | | | | | |
| 22° C. | 6.7 | 6.5 | 10.3 | 9.2 | 9.2 | 6.4 | 6.9 | 6.3 | 9.6 | 5.7 | 6.3 | 4.4 | 4.7 |
| −7° C. | 22.1 | 16.1 | 33.9 | 32.9 | 71.9 | 23.5 | 27.3 | 22.0 | 38.4 | 18.3 | 21.2 | 13.6 | 16.1 |
| Conductivity, mS/cm | 476 | 532 | 444 | 424 | 377 | 414 | 391 | 471 | 426 | 300 | 322 | 287 | 274 |
| pH | 13.21 | 12.13 | 12.32 | 7.71 | 7.63 | 7.62 | 8.11 | 7.76 | 8.87 | 8.90 | 8.88 | 9.33 | 8.83 |
| COD kg/kg | 0.35 | 0.08 | 0.22 | 0.28 | 0.37 | 0.31 | 0.42 | 0.18 | 0.31 | 0.43 | 0.47 | 0.44 | 0.59 |
| BOD kg/kg | 0.19 | 0.08 | 0.14 | 0.20 | 0.15 | 0.16 | 0.24 | 0.13 | 0.24 | 0.24 | 0.14 | 0.32 | 0.35 |
| PNSDOT Corrosion | −6.4 | −1.2 | −6.6 | 13.8 | 77.4 | 28.0 | 43.5 | 18.0 | 41.5 | −2.5 | −2.6 | −2.5 | −2.6 |

| | EXAMPLE | | | | | | | |
|---|---|---|---|---|---|---|---|---|
| | 27 | 28 | 29 | 30 | 31 | 32 | 33 | 34 |
| Composition | | | | | | | | |
| Sorbitol | 0 | 0 | 25 | 0 | 0 | 0 | 0 | 0 |
| MeG | 0 | 0 | 0 | 25 | 0 | 0 | 0 | 0 |
| Glycerol | 0 | 0 | 0 | 0 | 25 | 0 | 0 | 0 |
| Propylene Glycol | 0 | 0 | 0 | 0 | 0 | 25 | 0 | 0 |
| MBS | 25 | 0 | 0 | 0 | 0 | 0 | 25 | 0 |
| Sucrose | 0 | 25 | 0 | 0 | 0 | 0 | 0 | 25 |
| Potassium Carbonate | 0 | 0 | 0 | 0 | 0 | 0 | 0 | 0 |
| Sodium Formate | 0 | 0 | 0 | 0 | 0 | 0 | 0 | 0 |
| Potassium Acetate | 25 | 25 | 0 | 0 | 0 | 0 | 0 | 0 |
| Sodium Lactate | 0 | 0 | 25 | 25 | 25 | 25 | 25 | 25 |
| Water | 53 | 75 | 50 | 50 | 50 | 50 | 50 | 50 |
| Properties | | | | | | | | |
| Freezing Point, °C. | −40 | −31 | −27 | −29 | −39 | −44.3* | −29 | −27 |
| Viscosity, cSt | | | | | | | | |
| 22° C. | 4.3 | 6.4 | 10.9 | 10.9 | 8.2 | 8.1 | 8.3 | 13.4 |
| −7° C. | 12.9 | 21.7 | 59.2 | 60.1 | 36.3 | 40.3 | 36.1 | 71.6 |
| Conductivity, mS/cm | 355 | 292 | 199 | 202 | 200 | 181 | 276 | 189 |
| pH | 8.21 | 8.87 | 7.61 | 7.60 | 7.51 | 7.90 | 8.32 | 7.55 |
| COD kg/kg | 0.33 | 0.42 | 0.49 | 0.53 | 0.54 | 0.61 | 0.37 | 0.48 |
| BOD kg/kg | 0.20 | 0.29 | 0.34 | 0.33 | 0.36 | 0.40 | 0.25 | 0.25 |
| PNSDOT Corrosion | −2.6 | −2.4 | −1.3 | −1.5 | −1.2 | −0.7 | −0.8 | −0.3 |

EXAMPLES 35–38

Deicing and/or anti-icing compositions prepared in accordance with the present invention employing industrial or agricultural streams as at least part of the deicing and/or anti-icing composition were tested for freezing points. The results are set forth in Table 2.

TABLE 2

|  | Example | | | |
|---|---|---|---|---|
|  | 35 | 36 | 37 | 38 |
| Composition | | | | |
| CSB | 25 | 0 | 25 | 0 |
| Potassium Carbonate | 25 | 25 | 0 | 0 |
| CMS | 0 | 25 | 0 | 25 |
| Potassium acetate | 0 | 0 | 25 | 25 |
| Water | 50 | 50 | 50 | 50 |
| Properties | | | | |
| Freezing Point, ° C. | −44 | −38 | −48 | −42 |

CSB refers to Molasses Concentrated Separator Bottoms from Idaho Beet Sugar (Amalgamated Sugar) having the following approximate composition:

|  | % BY WEIGHT | % ON DRY SUBSTANCE |
|---|---|---|
| COMPONENT GROUPS | | |
| Dissolved Solids (RDS) | 74.84 | — |
| Ash | 22.81 | 30.47 |
| Crude Protein | 19.44 | 25.97 |
| Nitrogen Compounds (As N) | 3.11 | 4.16 |
| α-Amino Nitrogen Compounds (As N) | 0.41 | 0.55 |
| INDIVIDUAL COMPOUNDS | | |
| Sucrose | 13.13 | 17.54 |
| Raffinose | 3.96 | 5.29 |
| Invert | 0.020 | 0.027 |
| Betaine | 8.95 | 11.82 |
| Potassium | 8.85 | 11.82 |
| Sodium | 1.98 | 2.65 |
| Calcium | 0.04 | 0.05 |
| Chloride | 1.83 | 2.44 |
| Nitrate | 0.70 | 0.94 |
| Sulfate | 2.1 | 2.8 |
| Pyrrolidone Carboxylic Acid (PCA) | 6.29 | 8.40 |
| Tyrosine | 0.28 | 0.38 |
| Serine | 0.05 | 0.07 |
| Isoleucine and/or Proline | 0.47 | 0.63 |
| Glutamic Acid | 0.88 | 1.18 |
| Aspartic Acid | 0.89 | 1.19 |
| Threonine | 0.015 | 0.02 |
| Alanine | 0.16 | 0.21 |
| Valine | 0.12 | 0.16 |
| Glycine | 0.06 | 0.08 |

CMS refers to Concentrated Molasess Solids from Michigan Beet Sugar (Monitor Sugar) having the following approximate composition (DS=dry solids):

| Total Solids (Brix) | 70% approx. |
|---|---|
| Sucrose | 26.5% on DS approx. |
| Raffinose | 5.0% on DS approx. |
| Nitrogen Compound (as N) | 3.5% on DS approx. |
| Crude Protein | 22.0% on DS approx. |
| Betaine | 8.5% on DS approx. |
| Amino Acids | 0.5% on DS approx. |
| Ash | 30.0% on DS approx. |
| Bulk Density | 11.2 lbs./gallon approx. |
| Others | 4.0% on DS approx. |

EXAMPLE 39

A mixture of 25% by weight water, 65% by weight ethyl lactate and 10% by weight sodium lactate was prepared. No crystal formation was observed at a temperature of −50° C.

EXAMPLE 40

A mixture of 50% by weight water and 50% by weight ethyl lactate was prepared. The mixture had a melting point of −18° C.

EXAMPLE 41

A mixture of 70% by weight water, 24% by weight ethyl lactate and 6% by weight sodium lactate was prepared. The mixture had a melting point of −25° C. as determined by DSC and a pH of 6.0. For comparison, a 70% by weight water/30% by weight ethylene glycol solution has a melting point of −18° C.

EXAMPLE 42

The addition of 50% by weight of a 50% mixture of ethyl lactate in water to a concentrated, filtered corn steep liquor (containing 50% water and 50% solids comprising mostly lactic acid and sugars) caused a reduction in freezing point from −11° C. to −16° C. The addition of 2% by weight sodium lactate further reduced the freezing point to −20° C.

EXAMPLE 43

A mixture of 60% by weight water, 20% by weight sodium lactate, 2% by weight proline (an amino acid), 8% by weight sorbitol and 10% by weight sodium pyrrolidone carboxylate (sodium PCA) was prepared. No crystal formation at −35° C. was observed. The pH was 6.57. For comparison a 50% by weight solution propylene glycol has a freezing point of −36° C.

EXAMPLE 44

A mixture of 12% by weight methyl lactate, 44% by weight methyl glucoside and 44% by weight water was prepared. A melting point of −18° C. was observed. The mixture had a pH of 5.

EXAMPLE 45

A mixture containing 35% by weight methyl lactate, 35% by weight methyl glucoside and 30% by weight water has a melting point of −21° C. as determined by DSC.

EXAMPLE 46

A filtered concentrated liquid residue of a 50% mixture of corn stillage and steepwater containing 50% by weight water with a freezing point of −12° C. is heated to 90° C. and treated with 5% ethanol for 8 hours. The resulting mixture has a freezing point of −17° C. The addition of 2% sodium lactate further reduces the freezing point to −21° C.

EXAMPLES 47–53

Additional deicing and anti-icing fluids containing potassium carbonate were prepared in accordance with the present invention. The results are set forth below in Table 3.

TABLE 3

|  | Example | | | | | | |
|---|---|---|---|---|---|---|---|
|  | 47 | 48 | 49 | 50 | 51 | 52 | 53 |
| Composition | | | | | | | |
| Methyl Glucoside | 10 | 10 | 0 | 0 | 0 | 15 | 0 |
| Sodium Lactate | 10 | 0 | 0 | 0 | 10 | 0 | 0 |
| Potassium Lactate | 0 | 10 | 0 | 0 | 0 | 15 | 0 |
| Sorbitol | 0 | 0 | 0 | 0 | 10 | 0 | 0 |
| Glycerol | 0 | 0 | 0 | 33 | 0 | 0 | 0 |
| Propylene Glycol | 0 | 0 | 30 | 0 | 0 | 0 | 25 |
| Potassium Carbonate | 40 | 40 | 30 | 33 | 40 | 30 | 35 |
| Water | 40 | 40 | 40 | 34 | 40 | 40 | 40 |
| Properties | | | | | | | |
| Freezing Point, ° C. | −16 | −16 | −16 | −16 | −14 | −15 | −18 |

EXAMPLES 54–61

Additional deicing and anti-icing fluids containing potassium carbonate were prepared in accordance with the present invention and measured for BOD and COD values. The results are set forth below in Table 4. For comparative purposes, the COD and BOD for a 50/50 glycol/water mixture also are provided. Also, for reference the COD and BOD, respectively, for the individual components are as follows: methyl glucoside (1.24, 0.71), sodium lacate (0.86, 0.51), potassium lactate (0.75, 0.45), sorbitol (1.14, 0.70), propylene glycol (1.68, 1.14) potassium carbonate (0.00, 0.00), water (0.00, 0.00).

TABLE 4

|  | Example | | | | | | | |
|---|---|---|---|---|---|---|---|---|
|  | 54 | 55 | 56 | 57 | 58 | 59 | 60 | 61 |
| Composition | | | | | | | | |
| Methyl Glucoside | 10 | 10 | 0 | 0 | 0 | 15 | 0 | 0 |
| Sodium Lactate | 10 | 0 | 0 | 0 | 10 | 0 | 0 | 0 |
| Potassium Lactate | 0 | 10 | 0 | 0 | 0 | 15 | 0 | 0 |
| Sorbitol | 0 | 0 | 0 | 0 | 10 | 0 | 0 | 0 |
| Glycerol | 0 | 0 | 0 | 33 | 0 | 0 | 0 | 0 |
| Propylene Glycol | 0 | 0 | 30 | 0 | 0 | 0 | 25 | 50 |
| Potassium Carbonate | 40 | 40 | 30 | 33 | 40 | 30 | 35 | 0 |
| Water | 40 | 40 | 40 | 34 | 40 | 40 | 40 | 50 |
| Properties | | | | | | | | |
| COD kg/kg | 0.21 | 0.20 | 0.50 | 0.40 | 0.20 | 0.30 | 0.42 | 0.84 |
| BOD kg/kg | 0.12 | 0.12 | 0.34 | 0.24 | 0.12 | 0.17 | 0.29 | 0.57 |

EXAMPLE 62

A useful formulation for non-chloride liquid deicing consists of a solution in water of approximately 34-weight percent potassium acetate, 7.9 weight percent propylene glycol, 0.5 weight percent corrosion inhibitor and the balance water. This formulation has a freezing point of −40° F. The following table shows two cases. In case 62A, the formula is prepared from potassium acetate purchased at the normal commercial strength of 50 weight percent. In case 62B, potassium acetate is produced at or near the airport site by dissolving dry KOH in storm water and adding the requisite quantity of glacial acetic acid. The glycol in both cases is provided from two sources—(1) a recovered airport storm water containing 10 weight percent glycol, and (2) purchased commercial 90 weight percent glycol. Table 5 below shows the proportions of raw material required for each case.

|  | 62A | 62B |
|---|---|---|
| 50% potassium acetate | 64.0 | 0.0 |
| solid potassium hydroxide | 0.0 | 18.3 |
| glacial acetic acid | 0.0 | 19.6 |
| purchased 90% propylene glycol | 5.5 | 2.2 |
| recovered storm water - 10% propylene glycol | 30.0 | 59.4 |
| inhibitor | 0.5 | 0.5 |
| Total | 100.0 | 100.0 |

The advantages of operating in the manner of Example 62B are:
  A principal objective of this operation is to dispose of as much dilute storm water as possible. Case 62B consumes almost twice as much storm water per unit of deicing fluid produced and sold.
  Further to this same point, the storm water often has a negative value since the airport often must pay to have the municipal water treatment facilities handle this material.
  The reduced quantity of purchased commercial glycol results in a lower cost product.
  Eliminating double shipment and the shipment of water in the 50% commercial product reduces the potassium acetate cost.

From the above data it can be seen that excellent deicing and/or anti-icing materials can be obtained in accordance with the present invention.

Many variations of the present invention will suggest themselves to those skilled in the art in light of the above-detailed description. For example, any industrial or agricultural process stream that contains carboxylic acid salts, hydroxycarboxylic acid salts and/or dicarboxylic acid salts may be used to prepare the compositions of the present invention. Additionally, a wide variety of glucosides, carbonates, hydrocarbyl aldosides, and a variety of combinations of the components of the present invention may be employed in the compositions of the present invention. All such obvious modifications are within the full-intended scope of the appended claims.

The above-referenced patents, patent applications, test methods and publications are hereby incorporated by reference.

The invention claimed is:

1. A process for producing a deicing and/or anti-icing agent, said process comprising upgrading a prior use stream containing a glycol, glycerol, sorbitol, methyl glucoside or mixtures thereof, said stream being recovered from prior use as aircraft deicing and/or anti-icing fluids, engine radiator fluids, and/or gas dehydration fluids, wherein said upgrading comprises adding an effective amount of at least one of the following upgrading agents for deicing and/or anti-icing:
  i) an upgrading agent comprising one or more hydroxyl-containing organic compounds selected from the group consisting of hydrocarbyl aldosides, sorbitol, maltitol, monosaccharides, propylene glycol, ethylene glycol, glycerol and mixtures thereof;
  ii) an upgrading agent comprising one or more organic acid salts selected from the group consisting of a carbonic acid salt, a $C_1$–$C_4$ carboxylic acid salt, a hydroxycarboxylic acid salt, a dicarboxylic acid salt and mixtures thereof;
  iii) an upgrading agent comprising one or more inorganic salts;
  iv) an upgrading agent added to adjust the pH to slightly basic; or
  v) mixtures of any of the foregoing.

2. A process as defined in claim 1 wherein said inorganic salts are selected from the group consisting of sodium chloride, magnesium chloride, calcium chloride and mixtures thereof.

3. A process as defined in claim 1 wherein said agent or agents are contained in an industrial process stream.

4. A process as defined in claim 1 wherein said upgrading comprises adding an alkali to form an alkalized solution and adding an acid to said alkalized solution to form a salt.

5. A process as defined in claim 4 wherein said alkali comprises potassium and/or sodium hydroxide and said acid comprises acetic and/or lactic acid.

6. A process as defined in claim 1 wherein said upgrade further comprises an effective freezing point lowering amount of a material selected from the group consisting of amino acids and their salts, boric acid and its salts, lignin components and mixtures thereof.

7. A method for deicing and/or anti-icing surfaces comprising applying a deicing or anti-icing agent produced by the process as defined in claim 1 to a surface.

8. A method as defined in claim 7 wherein said surface comprises highways, bridges, airports, airport runways, particulate surfaces, salt piles, mineral ores, coal and combinations thereof.

9. A method for deicing and/or anti-icing vegetation comprising applying a deicing or anti-icing agent produced by the process as defined in claim 1 to said vegetation.

10. A method as defined in claim 9 wherein said vegetation comprises pre-harvest fruits, vegetable crops or golf course greens.

* * * * *